Figure 2:
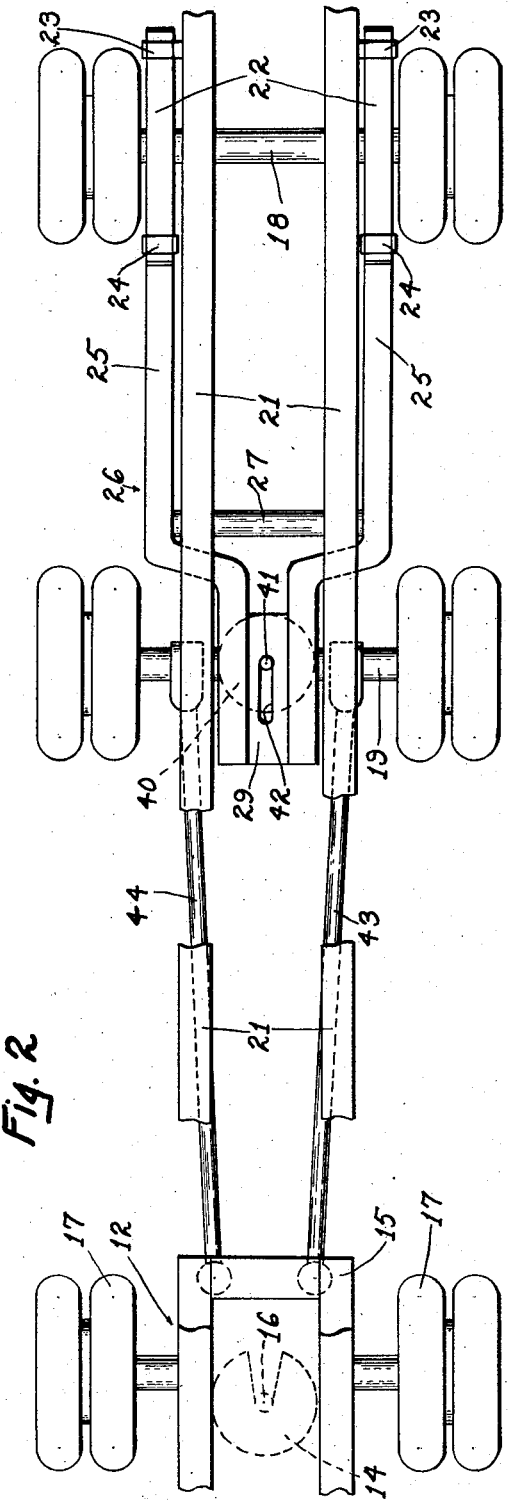

Sept. 1, 1959
JOHN PHIL FELLABAUM
NOW BY CHANGE OF NAME
JOHN PHIL FELBURN
TRANSPORTATION VEHICLE
2,902,293
Filed June 16, 1955
4 Sheets-Sheet 1
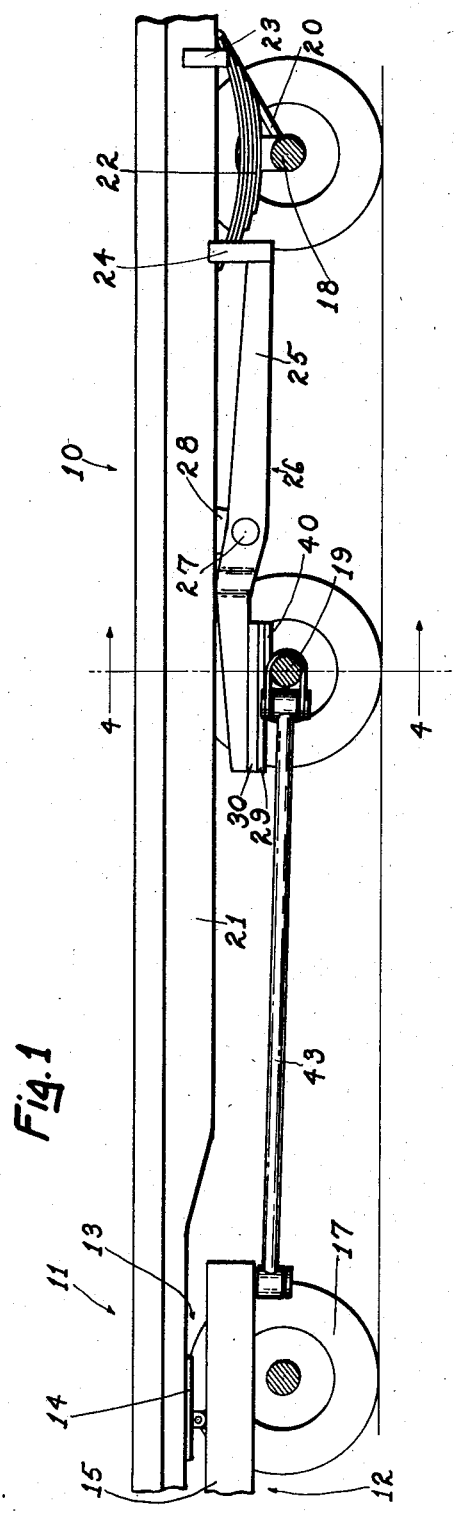
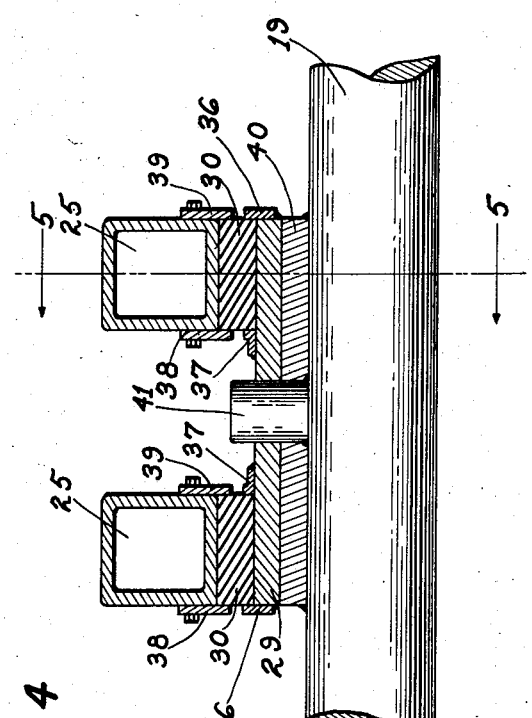
INVENTOR.
J. PHIL FELBURN
BY
Michael Williams
Attorney

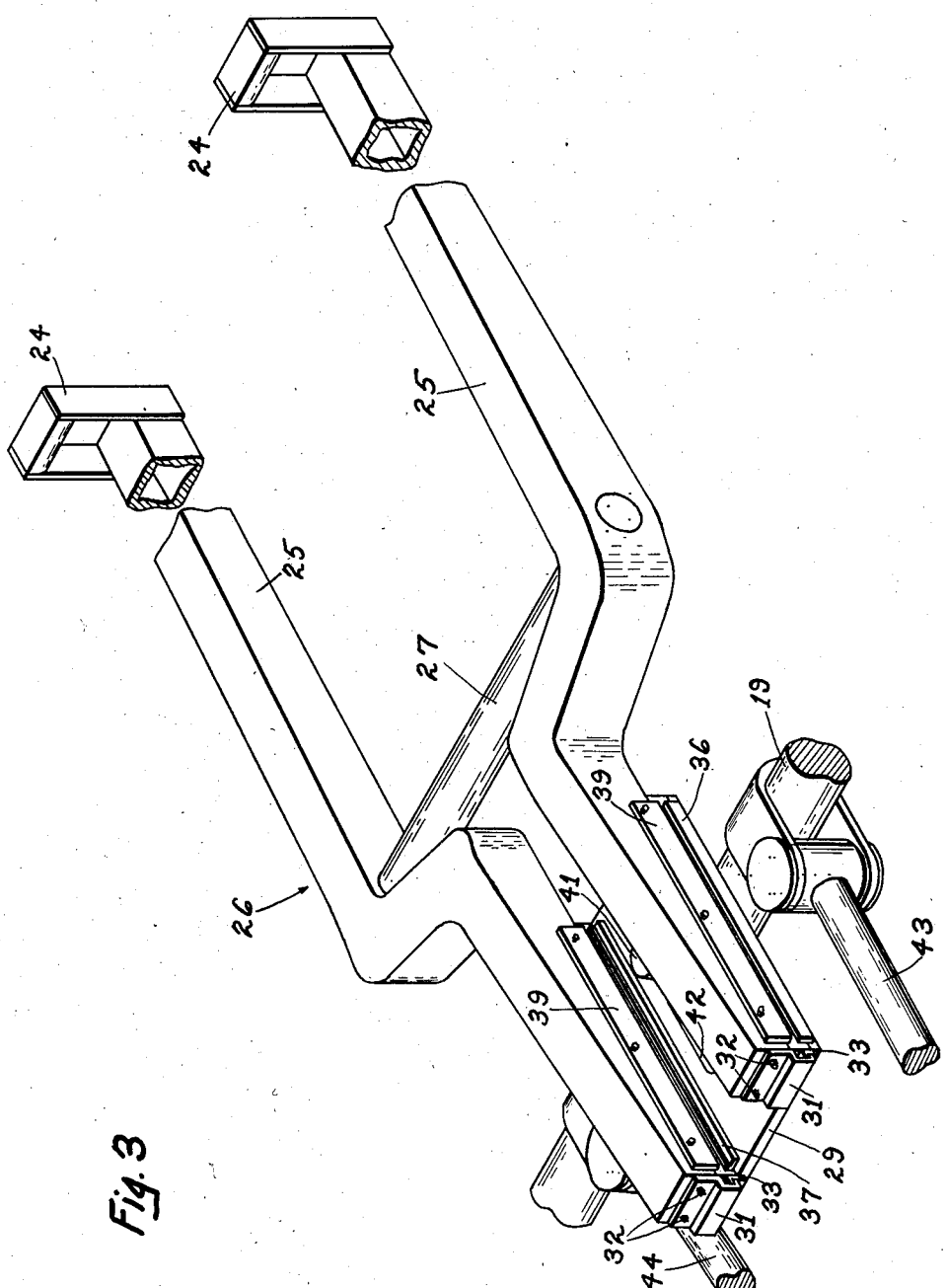

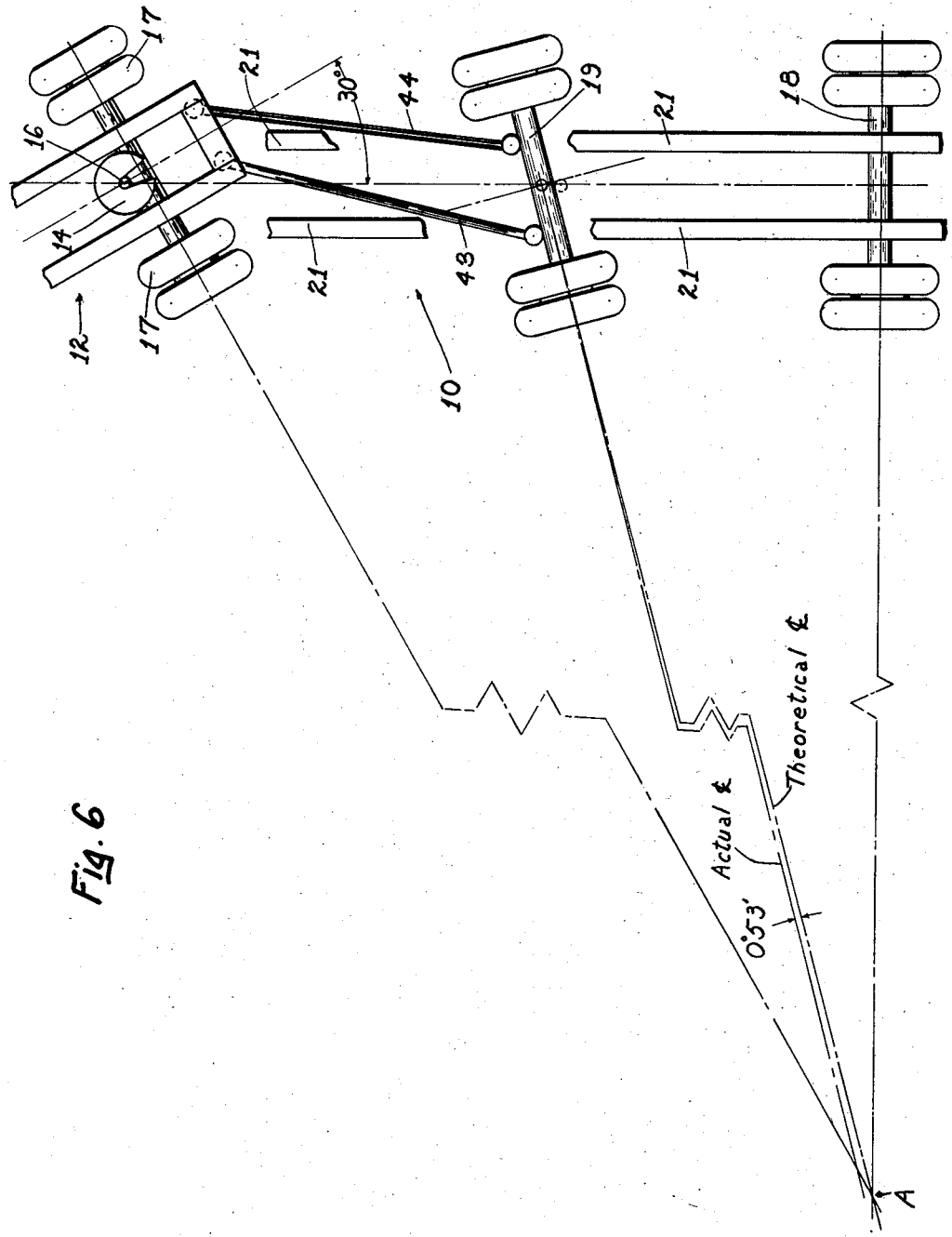

United States Patent Office 2,902,293
Patented Sept. 1, 1959

2,902,293

TRANSPORTATION VEHICLE

John Phil Fellabaum, Dayton, Ohio, now by change of name John Phil Felburn

Application June 16, 1955, Serial No. 515,847

9 Claims. (Cl. 280—426)

The present invention relates to a transportation vehicle, more particularly to vehicles of the general class which includes semi-trailers, and the principal object of the invention is to provide new and improved vehicles of such character.

In order to reduce road damage, many states have enacted laws limiting the maximum amount of weight which may legally be supported by the axles of a road vehicle. In many cases, the laws specify that when closely spaced axles are employed, the maximum allowable weight limits for these axles must be reduced since such axles do not distribute the load satisfactorily and tend to concentrate stresses at one place.

It has long been recognized that spacing the load bearing axles longitudinally of the vehicle permits carrying maximum loads with minimum road damage. However, prior art attempts to employ widely spaced tandem axles on semi-trailers have been relatively unsuccessful for one or more of the following reasons:

Firstly, attempts to merely spread the usual non-steerable tandem axles apart have resulted in semi-trailers which have been difficult to handle on curves and which have been extremely severe on tires. When negotiating a turn or curve with a trailer having this type construction, the trailer tires are dragged sideways so severely that a very noticeable braking effect is produced. As will be apparent, tire mileage on anything other than relatively straight roads is quite poor. Moreover, this induced tire scuffing on turns or curves is particularly dangerous during slippery weather since there is a greater tendency for the trailer to skid out of control.

Secondly, attempts to caster one or more of the semi-trailer axles or to otherwise mount them so that they trail or align themselves with the direction of trailer movement has resulted in trailers which have been difficult, if not veritably impossible, to maneuver in backing. Moreover, since the wheels merely follow the direction of trailer movement, they do not contribute to the trailer's stability.

In the third place, attempts to positively steer the wheels carried by one or more of the semi-trailer's axles in response to angular displacement between the respective longitudinal axes of the semi-trailer and the towing vehicle, or tractor, have operated with a certain degree of success. One of these latter construction is disclosed in Patent No. 2,433,269 issued December 23, 1947 to the present applicant and entitled, "Transportation Vehicle." Constructions of the general type disclosed in this patent have not achieved wide usage primarily because of high initial cost, excessive maintenance requirements, and excessive weight.

The present invention more nearly resembles the last mentioned types of constructions in that the wheels carried by one of the semi-trailer's axles are positively steered in response to angular displacement between the respective longitudinal axes of the semi-trailer and the tractor. However, in the interest of saving weight, reducing costs and maintenance, the present invention sacrifices a certain amount of steering accuracy at sharp turning radiuses. This sacrifice of steering accuracy has no measurable effect upon vehicle handling or tire life since these sharp turning radiuses generally occur only when maneuvering the vehicle in tight quarters and not during normal over-the-road travel. The many advantages of the present invention will become apparent from a study of the following description and from the drawings appended hereto.

Figure 5:
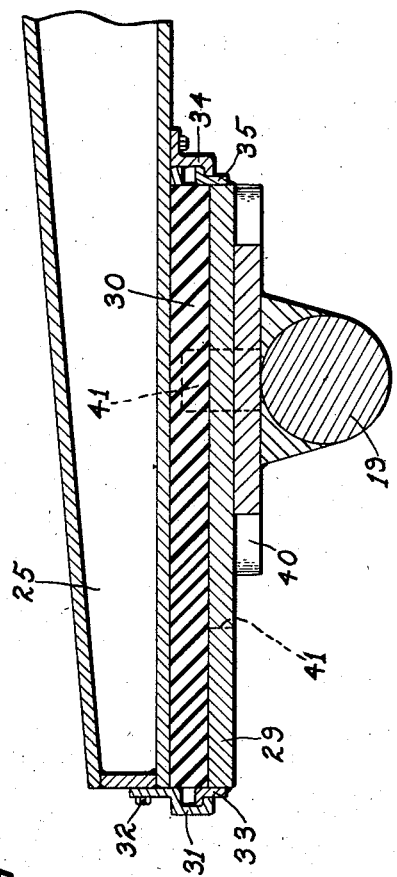

In the drawings accompanying this specification and forming a part of this application there is shown, for purpose of illustration, an embodiment which the invention may assume, and in these drawings:

Figure 1 is a fragmentary side elevational view of a semi-trailer constructed in accordance with the present invention and connected for operation with a suitable tractor, the road wheels on the side facing view being removed in the interest of clarity, Figure 2 is a top plan view of the structure shown in Figure 1, the bed of the trailer being removed to better illustrate the underlying construction, Figure 3 is an enlarged, fragmentary perspective view of certain details, Figure 4 is an enlarged, fragmentary sectional view generally corresponding to the line 4—4 of Figure 1, Figure 5 is a fragmentary sectional view generally corresponding to the line 5—5 of Figure 4, and Figure 6 is a reduced size, generally diagrammatic view of the invention shown negotiating a turn.

As best seen in Figures 1 and 2, the present invention is herein shown applied to a trailer 10 (commonly known as a semi-trailer) whose forward portion 11 is adapted to be supported by a suitable tractor 12 to which it is pivotally secured by the usual fifth wheel assembly 13. As in conventional constructions, the fifth wheel assembly 13 comprises a fifth wheel plate 14 secured to the frame 15 of the tractor and upon which the forward portion 11 of the trailer rests. The assembly further comprises a king pin 16 (see Figure 2) carried by the trailer and cooperable with the fifth wheel plate to provide a generally vertical axis about which the respective longitudinal axes of the tractor and the trailer may be angularly displaced.

Since the tractor herein disclosed is of conventional design, it has not been shown in its entirety; however, it is to be understood that it has the usual front, steerable wheels, a suitable engine and other necessary drive units, and rear drive wheels 17. Note that the frame 15 of the tractor extends rearwardly of the drive wheels 17 to permit the latter to be resiliently connected to the frame by means of suitable springs (not shown).

As pointed out, the forward portion 11 of the trailer is adapted to be supported by the tractor while the rear portion of the trailer is supported by wheels carried by respective axles 18, 19 spaced apart longitudinally of the trailer. As will be apparent, the spacing between the axles 18, 19 is considerable so that each axle can carry its maximum load.

In the present embodiment and with respect to the longitudinal axis of the trailer, axle 18 is fixed while axle 19 is steerable. Any suitable means may be employed to maintain axle 18 in fixed relation relative to the trailer axis, the construction herein disclosed employing conventional radius rods 20, each having one end pivotally secured to the axle and each having the other end pivotally secured to respective longitudinally extending frame members 21, 21 of the trailer.

Disposed adjacent frame members 21, 21 and positioned outboard of the latter for increased stability are a pair of supporting leaf springs 22, 22 whose center portions are secured to axle 18 by any suitable means. The rear portion of each leaf spring 22 is engageable with a slip shackle 23 carried by respective frame members 21 while the front portion of each is engageable with a slip shackle 24 carried by the rear portions of respective spaced-apart arm members 25 of a sub frame or walking beam assembly 26. Arms 25 are pivoted to the trailer about the axis of a rock shaft 27 carried by depending brackets 28 secured to respective frame members 21 and each arm is independently shiftable about the axis of the rock shaft. In a manner to be disclosed, the forward portions of arms 25 are adapted to support the steerable axle 19.

Since the rear portions of arms 25 are engageable with respective springs 22 positioned outboard of frame members 21, the rear portions of the arms are also preferably positioned outboard of the frame members. In the present embodiment, it is preferable to reduce the overall height of the trailer by positioning the forward portions of arms 25 as close as possible to axle 19. This necessitates that the forward portions of the arms converge so as to fit between the axially spaced wheels carried by axle 19 to permit steering of the axle. Such convergence also permits the arms to fit between the frame members 21 to allow maximum movement of the arms about the axis of rock shaft 27.

The construction for connecting the forward portions of arms 25 with steerable axle 19 may best be seen in Figures 4 and 5. As therein illustrated, a flat plate 29 extends between the front portions of the arms 25 for a purpose to be disclosed and, in the present embodiment, blocks 30, formed of rubber or other suitable resilient material, are interposed between each of the arms 25 and the plate 29 in order to provide for a certain amount of flexibility therebetween.

Means are provided for maintaining plate 29 and blocks 30 in assembled relation with arms 25 and, as most clearly shown in Figure 5, the front of each arm 25 has a hook shaped bracket 31 secured thereto by means of bolts 32 and interlocked with an angle bracket 33 welded or otherwise secured to the front portion of plate 29. In a similar manner, the rear of plate 29 is attached to respective arms 25, 25 by hook shaped brackets 34 and angle brackets 35. Note that each bracket 31, 33, 34 and 35 has a portion which engages an adjoining edge of its respective block 30 to maintain the block in fixed position between the plate 29 and respective arms 25.

Referring to Figure 4, brackets 36, 37 are shown secured by welding or the like to plate 29 on opposite sides of blocks 30 to form respective channels for receiving the blocks, and secured to arms 25 are brackets 38 and 39 which also form respective channels for the blocks. From the foregoing, it will be clear that plate 29 is resiliently secured across arms 25 by interposing resilient blocks therebetween, the blocks being confined by abutments which prevent displacement thereof.

A generally circular plate 40 is affixed by welding or the like to axle 19, the upper surface of plate 40 being adapted to seat against the lower surface of plate 29 (see especially Figures 3, 4 and 5). A centrally located upstanding pin 41 is carried by plate 40, the pin passing through a slot 42 formed in plate 29. Pin 41 forms an axis about which axle 19 is steerable, whereas slot 42 permits a certain amount of axle movement longitudinally of the trailer for a purpose to become clear. Although not shown, suitable means may be provided to prevent separation of the plates 29, 40; however, the weight of the trailer will normally hold the plates together and render such additional structure unnecessary.

Means are provided for steering axle 19 in response to relative angular displacement between the respective longitudinal axes of the tractor and the trailer and such means is herein shown to comprise rods 43, 44 whose rear ends are pivotally connected to axle 19 on opposite sides of the axis provided by pivot pin 41 and whose front ends are pivotally connected to the tractor on opposite sides of king pin 16 and preferably at respective points spaced rearwardly of the king pin. Any suitable arrangement may be employed to effect the pivoted connections of rods 43, 44; however, it is contemplated that such pivots be mounted in rubber to absorb road shocks and to compensate for slight misalignment.

With the construction disclosed, it will be apparent that, since axle 19 floats in slot 42 of plate 29, the axle will be drawn by the tractor during forward movement through rods 43, 44 and pushed by the tractor during rearward movement.

Before describing operation of the herein disclosed vehicle in traveling a non-rectilinear path, operation of the vehicle in passing over an obstruction will be disclosed. Assuming that the wheels on one end of axle 19 strike an obstruction, such axle end will be driven upwardly. This will cause the adjoining arm 25 to rotate about the axis of rock shaft 27 and, via the spring 22 connected to this arm, force the corresponding end of axle 18 downwardly to thereby equalize wheel movement. Because of the resilient mounting between arms 25 and plate 29, arms 25 may move more or less independently to provide a medium of independent wheel action and thus reduce the shock imparted to the trailer. It will be clear that in the event the wheels carried by one end of axle 18 strike an obstruction, axle 19 will be forced downwardly by a reversal of the above described action.

From the foregoing it will be evident that only two springs 22 are employed for springing both axles 18 and 19. This is an important factor in reducing the weight of the running gear and consequently the weight of the trailer.

It will be noted that rotation of arms 25 about the axis of the rock shaft 27 will cause the forward portion of the arms to rotate through an arc while axle 19, supported by the forward ends of the arms, is held in generally fixed position relative to the axis of the trailer by means of the fixed length rods 43, 44. For this reason, and for another later to appear, pin 41, carried by axle 19, is shiftable longitudinally of arms 25 in the slot 42 provided in plate 29.

With particular attention to Figure 6, operation of the vehicle herein disclosed in negotiating a turn or the like will be as follows: When the tractor 12 and the trailer 10 are moving in a straight line, their respective longitudinal axes coincide; however, when the tractor is turned, for example to the left as illustrated in Figure 6, such axes will rotate relative to each other about the generally vertical axis provided by king pin 16 of the fifth wheel assembly 13. As the tractor turns, the portion of its frame 15 spaced rearwardly of the fifth wheel and to which the forward ends of rods 43, 44 are secured will swing in an arc about the fifth wheel assembly.

During initial turning movement, rod 44 will pull the end of axle 19 to which it is connected forward whereas rod 43 will push the other end of axle 19 rearward. This will cause the axle to rotate about pivot pin 41 to thus effect steering thereof. As a sharper turn is made, the forward end of rod 43 will cross over the center of draft, or longitudinal axis of the trailer (as is indicated in Figure 6). When this occurs, both rods 43 and 44 will exert a forward pull on axle 19; however, because of its position on the arc about which it is turning, the forward pivot of rod 44 will move forward at a greater rate than will that of rod 43. Therefore, axle 19 will be rotated even further and, at the same time, will be pulled forward.

As hereinbefore mentioned, the present invention sacrifices a certain amount of steering accuracy, particularly at sharp turning radiuses, in the interest of practicality. By way of illustration, when negotiating a turn which requires that the axis of the tractor be disposed at the 30 degree angle shown relative to the axis of the trailer and wherein the vehicle will thereupon be turning about center A, the centerline of axle 19 should point directly toward this center if all tire slippage is to be eliminated. However, with the present arrangement of parts, axle 19 will not quite be turned sufficiently to align with this center but will be approximately fifty-three minutes short.

Since the wheels carried by axle 19 and those carried by axle 18 are substantially equally loaded, there will be a tendency for any turning error to be evenly shared by the two axles. Accordingly, each axle 18, 19 will, in effect, be misaligned an amount less than one-half degree during the turn illustrated. This amount of error is negligible when it is considered that a skidder trailer (one having one-steerable axles) exhibits an error per axle of seven degrees when the same turn is made.

During sharper turns, the turning error becomes progressively greater, for example, the error per axle of the present device being in the order of one degree when the respective axes of the tractor and trailer are disposed at an angle of forty degrees (the error per axle of the skidder type being about ten degrees under the same conditions).

Since most turns made at road speed (the time when maximum tire wear occurs) require that the tractor turn much less than thirty degrees, it will be apparent that the steering error induced will be negligible insofar as its effect on handling the vehicle or on tire mileage. It is an important advantage that backing a trailer constructed in accordance with the present invention will be no more difficult than backing a single axle trailer since the steerable axle is always under the direct control of the tractor.

As previously pointed out, axle 19 moves forward (guided by movement of pin 41 in slot 42 of plate 29) when the respective axes of the tractor and the trailer are angularly displaced as when negotiating a turn. Accordingly, by limiting the length of slot 42, it is possible to limit the maximum steering movement of axle 19 and also limit the maximum displacement of the axes of the tractor and trailer. By limiting the maximum displacement between the aforesaid axes, the present construction is far safer than those heretofore employed since the instant construction prevents jack knifing of the tractor-trailer unit.

Another advantage of the present construction is that it may easily be modified to provide for ready disassembly of the running gear of the trailer in manner similar to, and for the purposes disclosed in Patent No. 2,693,889, issued to applicant November 9, 1954 and entitled "Trailer With Detachable Load Platform." In order to obtain the advantages if this patent, it would require little more than the provision of a suitable structure for carrying rock shaft 27, spring shackles 23 and the upper ends of radius rods 20. This structure would correspond to frame 33 of the patent and would be slideable along the longitudinally extending frame members 21 in the same manner as therein disclosed.

If desired and in manner similar to that shown applied to drawbar 44 of the patent, rods 43, 44 could be constructed for telescoping action so that the wheel unit may be closely coupled to the tractor when the wheel unit alone is being drawn. Certain other slight modifications would also be necessary, such as the provision of suitable latch means and the like.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. A semi-trailer adapted to be drawn by a vehicle having means for supporting the forward portion of the trailer for pivotal movement about a vertical axis, comprising two sets of road engaging wheels spaced longitudinally of said trailer and including a steerable forward set of wheels and a non-steerable rear set of wheels, each set of wheels including axially spaced wheels disposed adjacent respective sides of said trailer, and a sub frame extending longitudinally of said trailer and including a pair of longitudinally extending members in spaced side-by-side relation, each member having an intermediate portion secured to said trailer for pivotal movement about a generally horizontal axis, a rear portion having a resilient connection with said rear set of wheels, and a forward portion flexibly connected to said forward set of wheels, the forward portions of said members converging to fit between the axially spaced wheels of said first set of wheels and provide for steering of the latter and each member being independently pivotable about said horizontal axis to transfer vertical movement of one of said sets of wheels through said resilient connection to vertical movement of the other set of wheels in the opposite direction.

2. A semi-trailer adapted to be drawn by a vehicle having means for supporting the forward portion of the trailer for pivotal movement about a vertical axis, comprising two sets of road engaging wheels spaced longitudinally of said trailer and including a steerable forward set of wheels and a non-steerable rear set of wheels, a sub frame extending longitudinally of said trailer and providing a rear portion having resilient connection with said rear set of wheels, an intermediate portion pivotally secured to said trailer, and a forward portion connected with said forward set of wheels, said forward set of wheels being mounted upon said sub frame for movement about a vertical pivot and also mounted for limited movement longitudinally of said sub-frame, said sub frame transferring vertical movement of one set of wheels in one direction through said resilient connection to movement of the other set of wheels in the opposite direction, and link means having one end pivotally connected to said forward set of wheels and the opposite end connectable to a portion of the vehicle spaced rearwardly of said vertical axis to tow said forward set of wheels and to effect steering and longitudinal movement thereof in accordance with relative angular displacement about said vertical axis of the respective longitudinal axes of said vehicle and said trailer.

3. A semi-trailer adapted to be drawn by a vehicle having means for supporting the forward portion of the trailer for pivotal movement about a vertical axis, comprising two sets of road engaging wheels spaced longitudinally of said trailer and including a steerable forward set of wheels and a non-steerable rear set of wheels, a sub frame extending longitudinally of said trailer and providing a rear portion, an intermediate portion pivotally secured to said trailer, and a forward portion connected with said forward set of wheels, said forward set of wheels being mounted upon said sub frame for movement about a vertical pivot to provide for steering and also mounted on said sub-frame for limited movement longitudinally thereof, a leaf spring extending longitudinally of said trailer and having an intermediate portion secured to said rear set of wheels, a rear portion engaged with said trailer, and a forward portion engaged with the rear portion of said sub frame, said sub frame transferring vertical movement of one set of wheels in one direction through said spring to movement of the other set of wheels in the opposite direction, and a pair of link members each having one end pivotally connected to said forward set of wheels on opposite sides of the axis about which said set of wheels is steerable, the opposite ends of said link members being pivotally connectable to a portion of said vehicle spaced rearwardly of said vertical axis and on opposite sides of the latter, said link members towing said forward set of wheels and effecting steering thereof and longitudinal movement in accordance with relative angular displacement about said vertical axis of the respective longitudinal axes of said vehicle and said trailer.

4. A conveyance, comprising a vehicle having a chassis including steerable front wheels and power driven back wheels and having an upright pivot connection over said back wheels, a semi-trailer having its front portion connected to and supported on said pivot connection so that steering said vehicle angularly displaces the longitudinal axes of said vehicle and semi-trailer about the axis of said upright pivot connection, two sets of road engaging wheels connected to said semi-trailer and spaced apart longitudinally thereof, the set of wheels nearer said vehicle being mounted for pivotable movement about an upright axis to provide for steering of such set of wheels and thus restrict scuffing thereof during turning movements, and a pair of rigid links each disposed on a respective side of the longitudinal axis of said trailer and each having its forward end pivotally connected to a portion of said vehicle spaced rearwardly of said upright pivot connection and on opposite sides of the latter and each having its rearward end pivotally connected to said nearer set of wheels on opposite sides of said upright axis to provide for steering action of said nearer set of wheels in accordance with relative angular displacement of the axes of said vehicle and said semi-trailer brought about by steering of said vehicle.

5. A steerable roadway trailer, comprising a bed, having a king pin at its forward end for vertical pivot connection and support with the fifth wheel plate of a towing vehicle, a sub-frame, extending longitudinally of said bed and spaced rearwardly of its forward end and intermediately journalled on a cross-wise pivot carried by said bed, spring means supporting a first wheel assembly and having opposite ends respectively connected to said bed and the rear end of said sub-frame, a second wheel assembly having a vertical pivot joint connection with the front end of said sub-frame to provide for steering of the trailer, and a pair of rigid towing bars extending longitudinally of said bed and having common ends pivotably connected to said second set of wheels on opposite sides of said vertical pivot joint and opposite ends connectable to the towing vehicle on opposite sides of the vertical pivot connection provided by said king pin and fifth wheel plate.

6. A semi-trailer adapted to be drawn by a vehicle having means for supporting the forward portion of the trailer for pivotal movement about a vertical axis, comprising two sets of road engaging wheels spaced longitudinally of said trailer and including a rear set of wheels mounted in angularly fixed relation with the longitudinal axis of said trailer and a forward set of wheels mounted for pivotal steering movement about a vertical pivot and also mounted for movement longitudinally of said trailer axis, and a pair of link members extending between said vehicle and said forward set of wheels to hold the latter against movement relative to said vehicle in either direction longitudinally of said link members and to effect pivotal steering movement thereof in accordance with relative angular displacement about said vertical axis between respective longitudinal axes of said vehicle and said trailer, respective ends of one of said link members being disposed on one side of said vertical axis and said vertical pivot and respective ends of the other link member being disposed on the opposite side of said vertical axis and said vertical pivot to provide for steering said second wheel set to the right when said vehicle turns to the right and to the left when said vehicle turns to the left.

7. A semi-trailer adapted to be drawn by a vehicle having means for supporting the forward portion of the trailer for pivotal movement about a vertical axis, comprising two sets of road engaging wheels secured to and spaced longitudinally of said trailer for supporting the rear portion thereof and each providing axially spaced-apart wheels disposed on respective sides of said trailer, a sub-frame extending longitudinally of said trailer between said wheel sets and having an intermediate portion journaled on a crosswise pivot carried by said trailer, the rear portion of said sub-frame being connected with the rearmost set of wheels and the forward portion of said sub-frame fitting between the axially spaced wheels of said foremost wheel set to increase clearance between such sub-frame portion and the underside of said trailer, said forward portions of said sub-frame carrying said foremost set of wheels for steering movement about a vertical pivot and the width of such sub-frame portion being materially less than the axial spacing of the wheels between which it is disposed to obviate interference therewith during steering, and a pair of link members extending longitudinally of said trailer and having adjoining ends pivotally connected to said set of wheels on opposite sides of said vertical pivot and opposite ends connectable to said vehicle on oppoite sides of said vertical axis for steering said connected wheel set in accordance with relative movement about said axis of said vehicle and said trailer.

8. A road vehicle comprising a tractor whose rear portion provides a fifth wheel plate, a semi-trailer whose forward portion rests upon said fifth wheel plate and is pivotable thereon about the axis of a generally vertically disposed king pin to provide for displacement of respective longitudinal axes of said tractor and said trailer during turning movement of said vehicle, two sets of road engaging wheels secured to and spaced longitudinally of said trailer for supporting the rear portion thereof and including a rear wheel set mounted in angularly fixed relation with the longitudinal axis of said trailer and a forward wheel set mounted for pivotal steering movement about a vertical pivot and also mounted for movement longitudinally of said trailer axis, and a pair of link members connected to said forward wheel set and extending longitudinally of said trailer for holding such wheel set in position longitudinally of said trailer and for effecting pivotal steering movement thereof, each link member being wholly disposed on a respective side of the longitudinal axis of said trailer during alignment of such axis with the longitudinal axis of said tractor and said link members having their rear ends pivotally connected to said foremost wheel set on opposite sides of said vertical pivot and their forward ends connected to said tractor, said link members moving longitudinally in opposite directions upon displacement of the longitudinal axes of said tractor and trailer about said king pin axis and exerting a push-pull force pivoting said foremost wheel set about its vertical pivot and thus effecting steering thereof.

9. A road vehicle comprising a tractor whose rear portion provides a fifth wheel plate, a semi-trailer whose forward portion rests upon said fifth wheel plate and is pivotable thereon about the axis of a generally vertically disposed king pin to provide for displacement of respective longitudinal axes of said tractor and said trailer during turning movement of said vehicle, two sets of road engaging wheels secured to and spaced longitudinally of said trailer for supporting the rear portion thereof and each providing axially spaced-apart wheels disposed on respective sides of the longitudinal axis of said trailer, a sub-frame extending longitudinally of said trailer between said wheel sets and having an intermediate portion journaled on a cross-wise pivot carried by said trailer, the rear portion of said sub-frame being connected with the rearmost set of wheels and the forward portion of said sub-frame being connected with the foremost set of wheels, the forward portion of said sub-frame fitting between the axially spaced wheels of said foremost wheel set and close to the latter's axle to increase clearance between such sub-frame portion and the underside of said trailer, said forward portion of said sub-frame carrying said foremost wheel set for steering movement about a vertical pivot and the width of such sub-frame portion being materially less than the axial spacing of the wheels between which it is disposed to provide clearance between said sub-frame and such wheels during steering movement of the latter, and a pair of link members extending longitudinally of said trailer and each wholly disposed on a respective side of the longitudinal axis of said trailer during alignment of such axis with the longitudinal axis of said tractor, said link members having their rear ends pivotally connected to said foremost wheel set on opposite sides of said vertical pivot and their forward ends connected to said tractor and said link members moving longitudinally in opposite directions upon displacement of the longitudinal axes of said tractor and trailer about said king pin axis and exerting a push-pull force pivoting said foremost wheel set about its vertical pivot and thus effecting steering thereof.

References Cited in the file of this patent

UNITED STATES PATENTS

| | | |
|---|---|---|
| 2,433,269 | Fellabaum | Dec. 23, 1947 |
| 2,655,388 | Nabors | Oct. 13, 1953 |
| 2,662,781 | Hopson | Dec. 15, 1953 |
| 2,717,787 | Ward | Sept. 13, 1955 |
| 2,764,424 | Standing | Sept. 25, 1956 |

FOREIGN PATENTS

| | | |
|---|---|---|
| 547,810 | France | Oct. 3, 1922 |
| 451,083 | Germany | Oct. 17, 1927 |
| 210,225 | Great Britain | Jan. 31, 1924 |